UNITED STATES PATENT OFFICE.

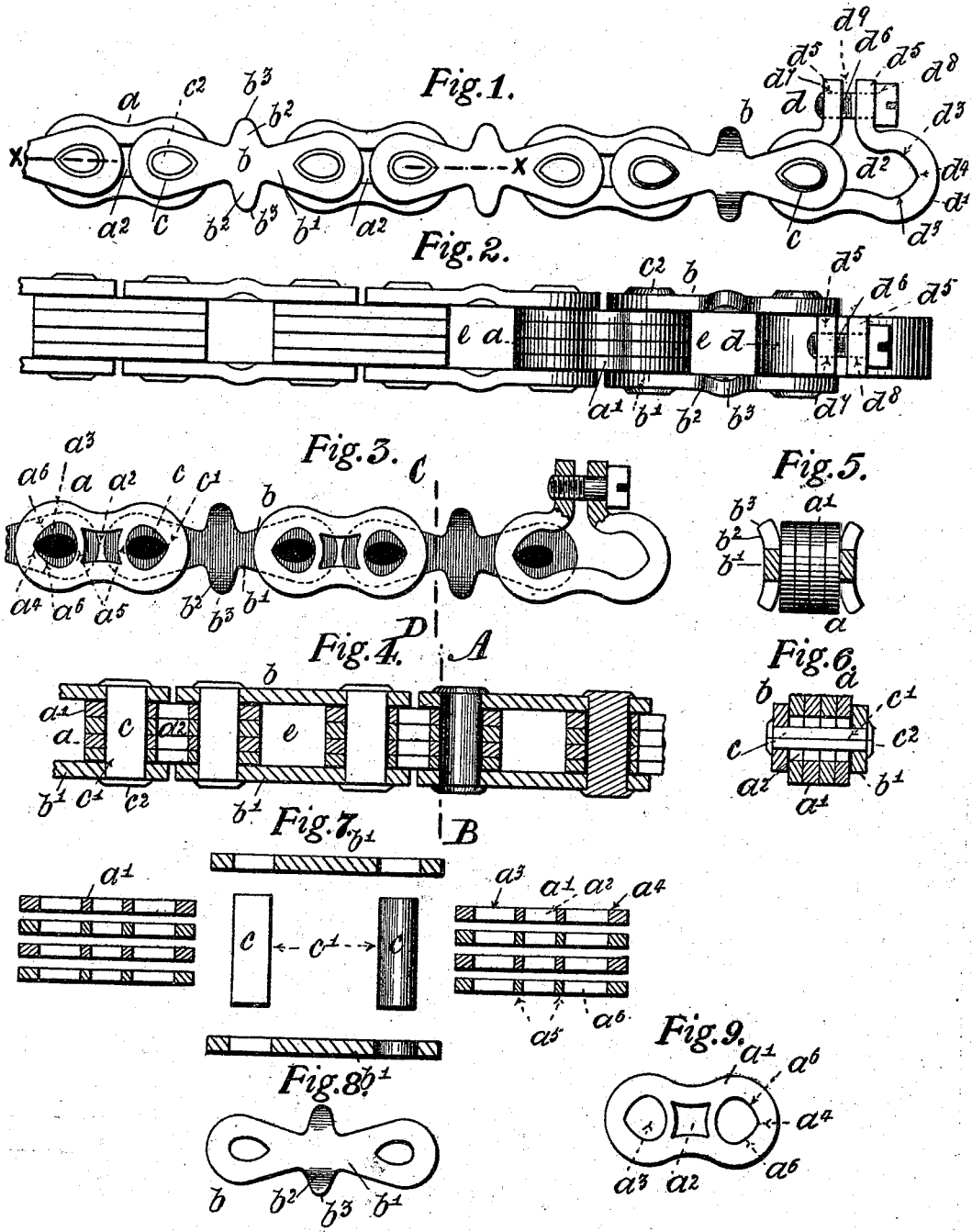

ROBERT FREDERICK HALL, OF BIRMINGHAM, ENGLAND.

DRIVE-CHAIN.

SPECIFICATION forming part of Letters Patent No. 554,181, dated February 4, 1896.

Application filed May 31, 1894. Serial No. 513,070. (No model.) Patented in England February 1, 1894, No. 2,163, and April 26, 1894, No. 8,270.

*To all whom it may concern:*

Be it known that I, ROBERT FREDERICK HALL, manufacturer, a subject of the Queen of Great Britain, residing at Sampson Road North, Sparkbrook, in the city of Birmingham, England, have invented certain new and useful Improvements in Drive-Chains; and I do hereby declare the following to be a full, clear, and exact description of the invention, reference being had to the accompanying drawings, which form part of this specification, for which invention Letters Patent of Great Britain have been granted to me bearing date, respectively, the 1st day of February, 1894, No. 2,163, and the 26th day of April, 1894, No. 8,270.

My invention relates to improvements in driving-chains for cycles and machinery.

Figure 1 of the accompanying drawings represents in side elevation a length of cycle drive-chain, made according to my invention. Fig. 2 represents a top side plan of Fig. 1. Fig. 3 represents a vertical section of the said chain, showing the knife-edged pins or rivets in section and the pitch-bars of alternate links in elevation. Fig. 4 represents a horizontal section of a portion of a chain upon the dotted lines $x\,x$, Fig. 1. Fig. 5 represents a transverse section of the chain upon the dotted line A B, Fig. 4, looking toward the knife-edge of the rivet. Fig. 6 represents a transverse section of the chain upon the dotted line C D, Fig. 3. Fig. 7 represents a longitudinal section of the whole of the component parts of two alternate and one intermediate links. Fig. 8 represents a side elevation of an intermediate link, and Fig. 9 is a side elevation of an alternate link.

In Figs. 1 to 9, $a$ are alternate links, and $b$ are intermediate links, the one connected to the other, so as to make up a length of chain by or through the medium of knife-edged cross pins or rivets $c$. Each of the alternate links $a$ is preferably made up of a series of cut-out sheet-metal link-shaped plates $a'$, placed face to face and with the end piercings $a^3$ of their cut-out middle parts, $a^2$, formed V or wedge shaped at $a^4$, within which wedge ends the presented knife-edges $c'$ of the pins or rivets $c$, carried by the intermediate links, $b$, take their bearing. The cut-out middle parts, $a^2$, have pitch-bars $a^5$ for confining or keeping snug the knife-edged rivets, whereby backlash is prevented.

Each of the intermediate links, $b$, consists of two side plates or cheeks, $b'$, kept parallel and separated from each other to a given distance (so as to form the tooth-spaces $d$) by the end inside faces of them coming upon the end outside faces of the alternate links, and the whole are joined up by the cross pins or rivets $c$, whose ends are expanded into heads $c^2$.

The middles of the side plates, $b'$, of the links $b$ have piloting-horns or tooth-finders $b^2$, which show the way to or conduct or guide the spaces $e$ of the links of the chain over the teeth by the said piloting-horns having their tips $b^3$ inclined slightly outward, whereby the said finders feel the tips of the teeth in advance of the links themselves and the spaces between them, and whereby the said links are prevented from striking and riding upon the said teeth, and are so made to travel uniformly and evenly over the chain-wheels.

Referring back to the alternate links $a$, it is understood that the same may be made either from a series of thin metal plates or solid, and if necessary, without the backlash-bars, and that the points $a^4$ of the V-shaped ends constitute confined bearings for the knife-edges of the pins or rivets, and that the inclined sides $a^6$ form bearing finders or guides for guiding and keeping the said knife-edges up to the said points $a^4$ when the chain is drawn taut.

$d$ is a joining-up link (represented on the ends of the lengths of chain, Figs. 1, 2 and 3) consisting of a loop-shaped body part $d'$, with a middle piercing, $d^2$, having tapering ends $d^3$ converging outwardly to confined bearing ends or points $d^4$, alike unto the other links of the chain.

One side of the body part is split or divided and has flanges or lugs $d^5$, which are drawn together by a screw-pin $d^6$, passing through screwed and plain holes $d^7\,d^8$ made through the said lugs or flanges.

When the screw-pin is removed, the gap or space $d^9$, located between the flanges $d^5\,d^5$, springs open and leaves a space between them of a breadth sufficient for the passing therethrough of the end cross rivets or pins $c$ of the end links. Thus, in making a continuous chain, pass the end cross pins or rivets $c$ of the end links, $b$, of a length of chain, as shown, through the gap $d^9$, then pass the screw-pin $d^6$ through the holes in the flanges $d^5$, and screw up the pin, when the said flanges are drawn together and the loose ends of the chain united or coupled.

Instead of the flanges of the joining-up link being connected together and drawn up by a screw-pin a cross-rivet may be used in lieu of the said screw-pin.

Having fully described my invention, what I desire to claim and secure by Letters Patent is—

A drive-chain made up of alternate and intermediate links, the intermediate links being formed or provided with piloting-horns or tooth-finders, substantially as described.

In testimony that I claim the foregoing I have hereunto set my hand this 26th day of April, 1894.

ROBERT FREDERICK HALL.

Witnesses:
HENRY SKERRETT,
WILLIAM H. LONG.